United States Patent [19]

Schurman

[11] Patent Number: 4,773,147

[45] Date of Patent: Sep. 27, 1988

[54] METHOD OF MANUFACTURE OF BLOW MOLDED CASES HAVING A COMPARTMENT AND A COMPARTMENT DOOR

[75] Inventor: Peter T. Schurman, Woodbridge, Conn.

[73] Assignee: The Plastic Forming Company, Inc., Woodbridge, Conn.

[21] Appl. No.: 86,902

[22] Filed: Aug. 18, 1987

[51] Int. Cl.⁴ ............................................. B23P 11/00
[52] U.S. Cl. ........................................ 29/415; 29/416; 29/434; 206/527; 264/152; 264/536
[58] Field of Search ......................... 29/415, 416, 434; 206/527; 220/253; 264/152, 523, 536

[56] References Cited

U.S. PATENT DOCUMENTS

| | | | |
|---|---|---|---|
| 4,103,411 | 8/1978 | Gottsegen | 264/152 X |
| 4,179,790 | 12/1979 | Tornerfelt | 29/416 |
| 4,615,464 | 10/1986 | Byrns | 29/434 X |
| 4,621,404 | 11/1986 | Browning | 29/463 |

Primary Examiner—Mark Rosenbaum
Assistant Examiner—Frances Chin
Attorney, Agent, or Firm—St. Onge Steward Johnston & Reens

[57] ABSTRACT

A method of manufacturing blow molded plastic cases of the type comprising two hollow hinged containers where at least one of the containers has a compartment, and a door for the compartment is presented. The method allows the manufacture of compartment doors as part of an integrated manufacture without requiring a separate blow molding step to make the door. The method comprises blow molding a standard size door as one face of a first hollow container, in an area of the container which would otherwise be cut out and discarded, removing the door from the container, storing the door for future use, and assembling the first hollow container with a second blow molded hollow container to make a first case. A third and fourth hollow container are blow molded, and an area sized to accommodate the door stock is cut from the third container. The door is retrieved from stock and mounted in the third hollow container. The third and fourth hollow containers are then assembled together to form a second case having a compartment and a compartment door.

5 Claims, 4 Drawing Sheets

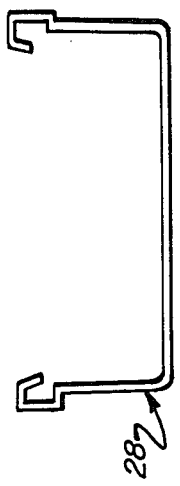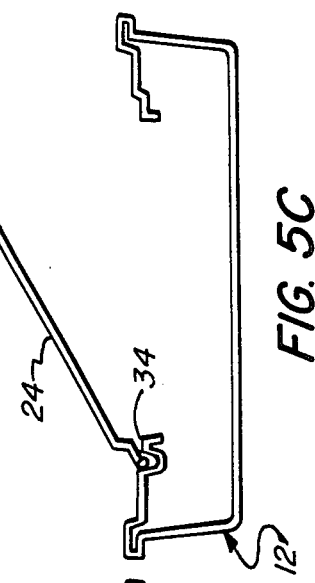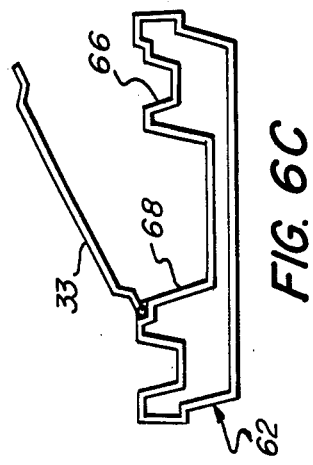
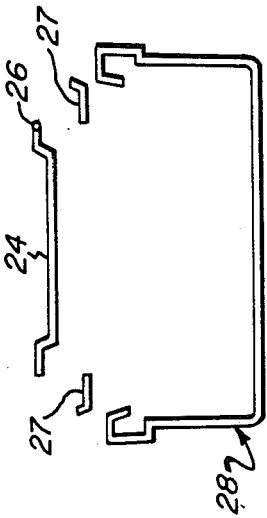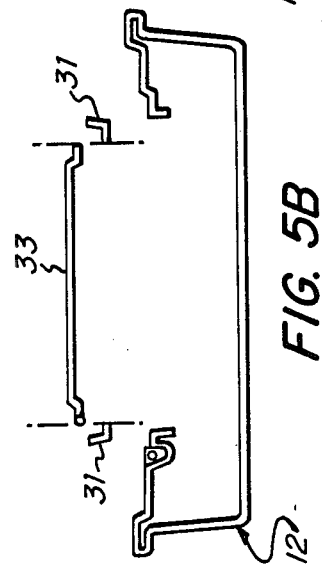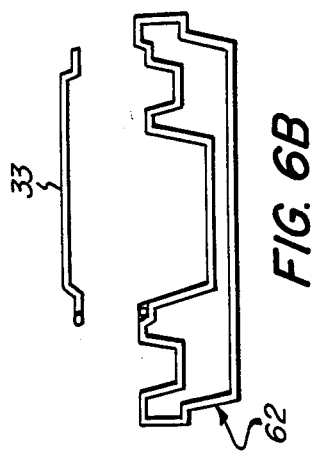
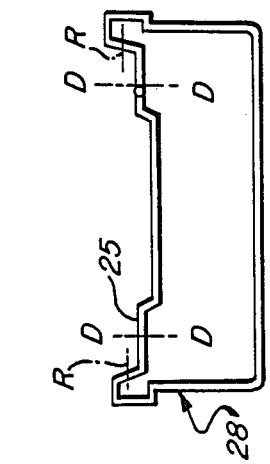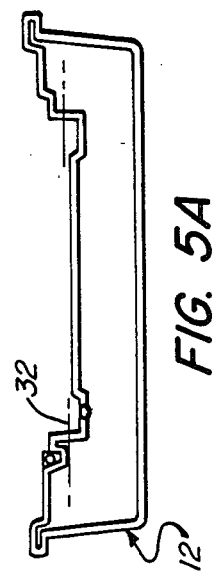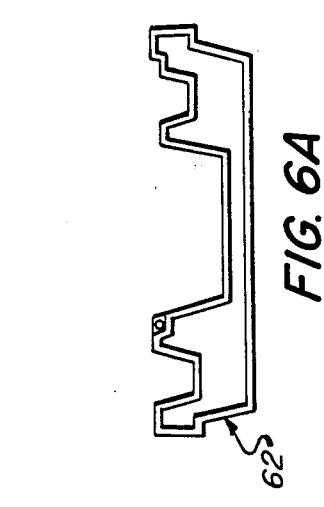
FIG. 4A  FIG. 4B  FIG. 4C
FIG. 5A  FIG. 5B  FIG. 5C
FIG. 6A  FIG. 6B  FIG. 6C

METHOD OF MANUFACTURE OF BLOW MOLDED CASES HAVING A COMPARTMENT AND A COMPARTMENT DOOR

FIELD OF THE INVENTION

The present invention relates to a method of manufacture of blow molded cases having a compartment and a compartment door.

BACKGROUND OF THE INVENTION

The manufacture of plastic articles by blow molding results in the formation of hollow plastic articles. Two such articles, such as a base and a lid, may be formed with hinges and joined together to form a case, such as a camera case, briefcase, and cases for sporting activities, such as an archery case or a fishing tackle box.

In some applications one such hollow plastic article will have one entire face removed or cut out to form an open container, as for instance, in the camera case where a foam insert may be mounted in a base so that camera accessories can be fitted into and secured by the foam. In other instances, the amount of cut out material from one such article will be small or non-existent, for instance where a base is molded into trays and bins to hold accessories.

A second hollow plastic article may be formed as a lid, and joined with one of the above articles to form an entire case. It is often desirable to provide an enclosure or compartment for storing manuals and larger items in this lid. The compartment is formed by cutting an opening from the hollow lid to give access to the hollow interior. A door, sized to cover the opening, is mounted in the opening to allow closing of the compartment.

Typically this door has been formed separately from the either the base or the lid because there is an insufficient amount of material cut from the articles to be effective to cover the opening. For example, the material derived from cutting an opening into the lid compartment would fall through the opening instead of acting as a closure. In addition, when the base is molded into trays and bins, there will be no cut-out material useful as a compartment door.

It is desirable therefore to provide a method of manufacture which allows for the formation of an or other formed parts as part of the manufacturing process which does not require the formation of a door using a separate mold.

SUMMARY OF THE INVENTION

A method of manufacture of blow molded plastic cases having a compartment and a compartment door is presented. The method comprises blow molding a first group of hollow containers from a polymeric material, where each container of the first group of hollow containers has a recessed face on one side thereof. The first group of hollow containers will be hereinafter referred to as "first bases"; however, the first group of containers is not limited only to bases, and may instead be the lids of a case. The recessed face of the first base has molded therein a formed part such as a door shape with hinge pins generally in the plane of the door. The recessed face is routed from the first base, and the formed part, which may be a door shape, is cut from the recessed face to form a door. These doors are stored for future use, while the open container formed by cutting out the recessed face is adapted for the particular uses of the case. For instance a base would be adapted for holding camera accessories by insertion of a foam accessory holder in the base.

A second group of hollow containers sized and adapted to be joined with the first group of containers is blow molded from a polymeric material. The second group of hollow containers is referred to hereinafter as "first lids"; however, the second group of containers is not limited only to lids, and may instead be the bases of a case. The first lids and bases are assembled into a plurality of first cases.

A third group of hollow containers is blow molded from a polymeric material. The third group of hollow containers is referred to hereinafter as "second lids"; however, the third group of containers is not limited only to lids, and may instead be the bases of a case. Each second lid has a recessed face sized to accommodate the formed part or door cut from the first bases and previously placed in storage. The recessed face of the second lids is removed to form an opening into a compartment space inside the second lids, and lateral holes for door hinge pins are drilled. The recessed face of the second lids contains second formed part such as a second a molded door shape, which is cut from this recessed face and stored for future use.

The stored doors cut from the first bases are then installed in the compartment openings of the second lids by inserting the door pins into the lateral holes.

A fourth group of containers sized and adapted to be joined with the third group of containers are then blow molded from a polymeric material. The fourth group of cases is referred to hereinafter as "second bases"; however, the fourth group of cases is not limited only to bases, and may instead be the lids of a case. The second bases are assembled with the second lids into another plurality of cases.

The method of manufacture is thus an improvement over the prior methods used in the manufacture of plastic articles in that it eliminates the separate manufacturing step for making a compartment door in a plastic article, and it allows the production of such doors as part of the normal manufacturing processes of products other than that in which the door will be used. In addition, the method minimizes the need to dispose of or recycle plastic waste scraps cut from the plastic containers in adapting the containers to particular uses.

BRIEF DESCRIPTION OF THE DRAWINGS

The present invention will be better understood and its advantages more apparent in view of the following detailed description, especially when read with reference to the appended drawings, wherein:

FIG. 4A is a schematic cross-section of a first base along the line 4—4 of FIG. 1, prior to removal of the recessed faces and doors.

FIGS. 4B and 4C are schematic cross-sections of a first base with the recessed faces and doors removed.

FIG. 5A is a schematic cross-section of a second lid along the line 5—5 of FIG. 2 prior to removal of the recessed faces.

FIG. 5B is a schematic cross-section of a second lid with the recessed faces and door removed.

FIG. 5C is a schematic cross-section of a second lid with the door of FIG. 4B installed therein.

FIG. 6A is a schematic cross-section of the third base shown in FIG. 3B wherein the third base has molded compartments, instead of cut-out compartments.

FIG. 6B is a schematic cross-section of a the base shown in FIG. 6A prior to assembly with the door shown in FIG. 5B.

FIG. 6C is a schematic cross-section of a door assembled with the base shown in FIGS. 6A and 6B.

BEST MODE OF THE INVENTION

Figure 3A:
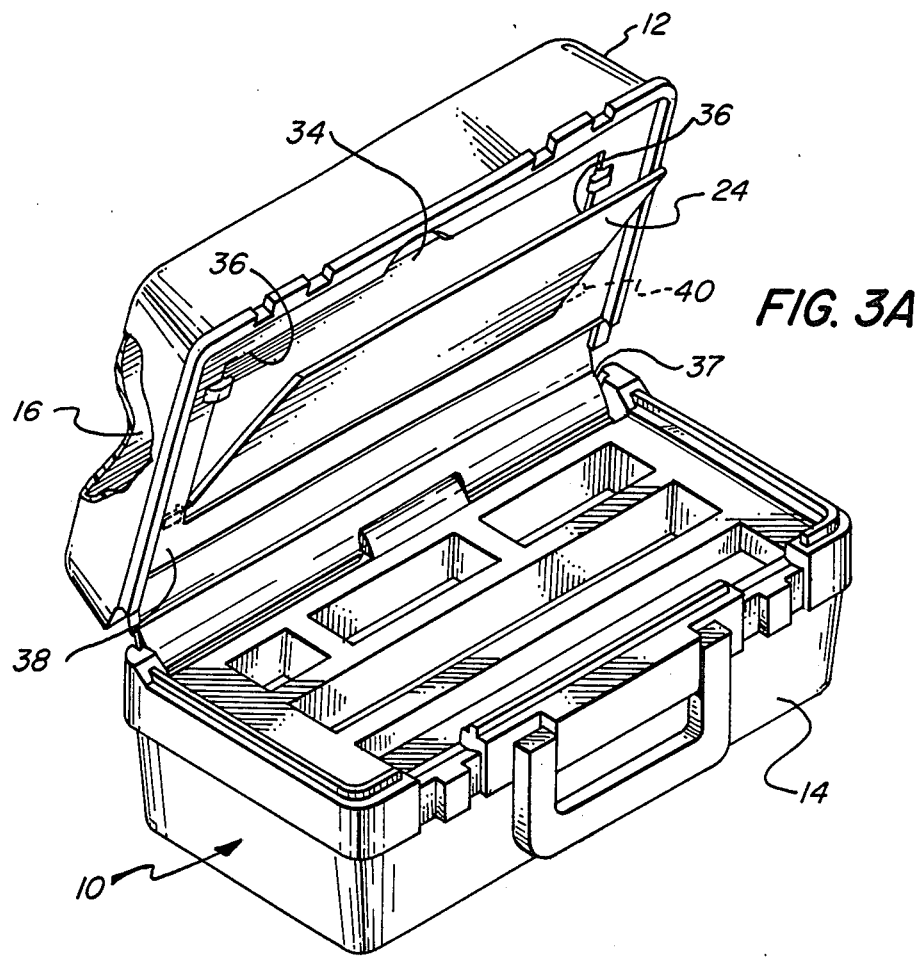
FIG. 3A is a perspective view of an example of a second lid and base assembled to form a second case, with a compartment door installed to cover a cut-out hollow compartment in the lid.

This invention relates to a method of manufacturing blow molded cases having a compartment and a compartment door without the need for a separate step to blow mold a compartment door. As illustrated in FIG. 3A, the method of the present invention relates to plastic cases 10 comprising two hinged hollow containers, a lid 12, and a base 14 joined to each other. In the lid 12 there is an interior compartment space 16 accessible through an opening 34 covered by a door 24.

Figure 1:
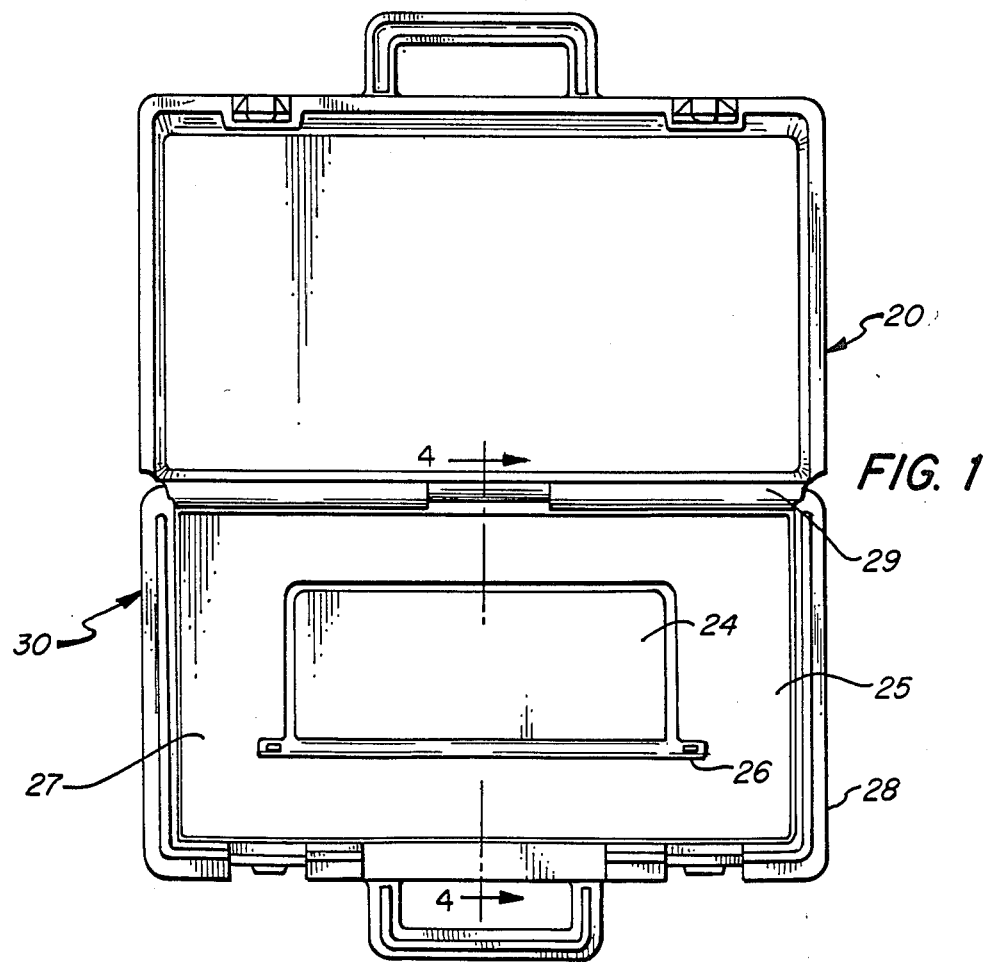
FIG. 1 is a top plan view of an example of a first case having a first base assembled with a first lid, where the first base is shown prior to removal of a door and margin area.

In accordance with the invention, a first group of hollow containers, an example of which is shown in FIG. 1 as a first base 28, is blow molded from a polymeric material. The first base 28 has a recessed face 25 on one side thereof. Molded into the recessed face 25 is a first molded part such as a rectangular door shape 24, which has hinge pins 26 in the plane of the door and congruent with and extending from one edge of the door shape 24. The recessed face 25 is removed from the hollow container 28 by routing, leaving an open container. A piece of foam, not shown, with cut-outs for mechanical parts such as camera lenses may be inserted into the open container.

The door shape 24 is separated from the margin 27 by die cutting to form a separate door, and the margin 27 is discarded or recycled. The door 24 is then stored for use in other articles.

Preferably, the door 24 is molded in a selected standard size so that it may be used in other articles requiring a standard size door without further sizing or cutting of the door.

As shown in FIG. 1, a second group of hollow containers, shown as first lids 20, is also formed from a polymeric material by blow molding. The first base 28 is assembled with the first lid 20 by means of molded hinges 29, to form a complete and assembled plurality of first cases 30.

As previously stated, the first group of hollow containers may be lids as well as bases. Thus the foregoing description would apply to a first group of hollow containers which are lids having a recessed area and a door therein which are removed from one side of the lid, and which are joined with a second group of hollow containers which are bases to form a first group of cases.

Figure 2:
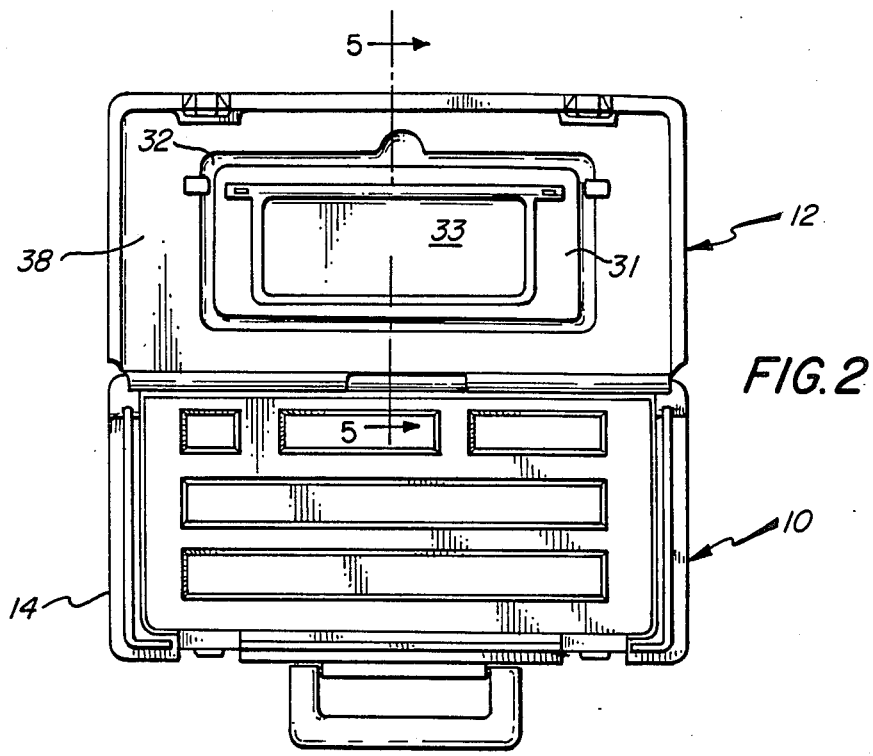
FIG. 2 is a top plan view of an example of a second case having a second base assembled with a second lid, where the second lid is shown prior to removal of a door and margin area.

As shown in FIGS. 2 and 3A, a third group of hollow containers, such as the second lid 12 is blow molded from a plastic material with a rectangular recessed face 32 on one face thereof. The recessed face 32 is removed by routing to form a rectangular opening 34 giving access to a compartment 16, compartment shown in FIG. 3A as comprising the interior space of the second lid 12.

The recessed face 32 may have formed in it a second formed part such as second door 33 which may be cut out from the margin 31 and stored in accordance with the description given for the first bases. The second door 33 may be used in other cases as later described in reference to FIGS. 3B and 4–6.

The rectangular compartment opening 34 has a lip 36 around its perimeter which is formed inwards of the face 38 of the hollow container 12 so that the door 24 when mounted in the opening 34 will lie flush with and in the same plane as the face 38 of hollow container 12. The opening 34 and lip 36 are sized to accommodate the stocked door 24, so that the door 24 fits snugly in the opening 34. Lateral holes 40 which receive the hinge pins 26 of the door 24 are drilled in each edge of the opening 34.

The standard size door 24 is then retrieved from stock and mounted in the opening 34 by fitting the hinge pins 26 into the lateral holes 40.

A fourth group of hollow containers, such as second bases 14, is blow molded from a polymeric material, and the third and fourth groups of hollow containers are joined together by means of hinges 37 molded in the second lid 12 and the second base 14 to form a plurality of second cases 10 having a compartment 16 and a compartment door 24.

As previously stated, the third group of hollow containers may be bases as well as lids. Thus the foregoing description would apply to a third group of hollow containers which are bases having a recessed area and a door therein which are removed from one side of the base, and which are joined with a second group of hollow containers which are lids to form a second group of cases.

A second formed part such as a second size door may be created by taking the removed recessed area 32 of the second lid 12 and cutting from that recessed the 32 another door 33.

Figure 3B:
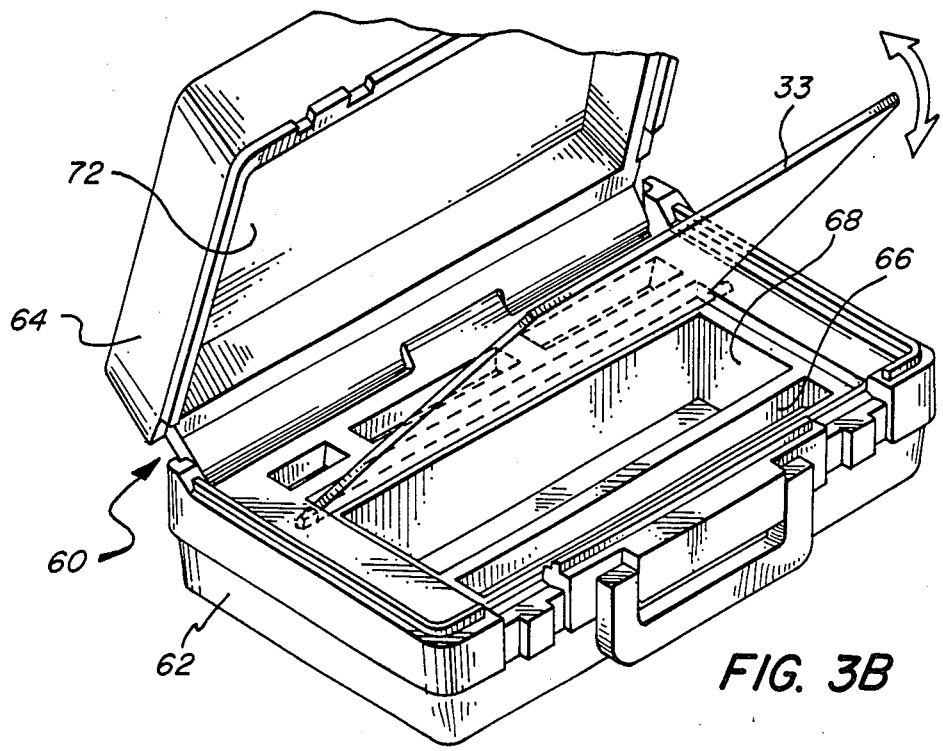
FIG. 3B is a perspective view of a third case wherein a compartment door is installed to cover a molded compartment in the base.

Referring to FIG. 3B, still another plurality of third cases 60 comprising a fifth group of hollow containers such as third bases 62 and a sixth group of hollow containers such as third lids 64 are blow molded from a polymeric material. The base 62 includes a series of molded compartments 66 and 68 which are formed during the blow molding operation. The stock door 33 is utilized to cover compartments 66 and 68. Thus, parts for a tool may be stored beneath the door 33, while the tool itself can be stored above the lid 33 in the compartment 72 in the third lid 64.

It should also be understood that stock doors may be used in hollow double wall containers. Thus, referring to FIGS. 6A through 6C, a stock door 33 can be used with a container that does not have a separate lid. Thus the hinges 37 and 72 shown in FIGS. 3A and 3B, can be eliminated during molding and a completed case formed from a hollow double wall container and a stock door.

Figure 7:
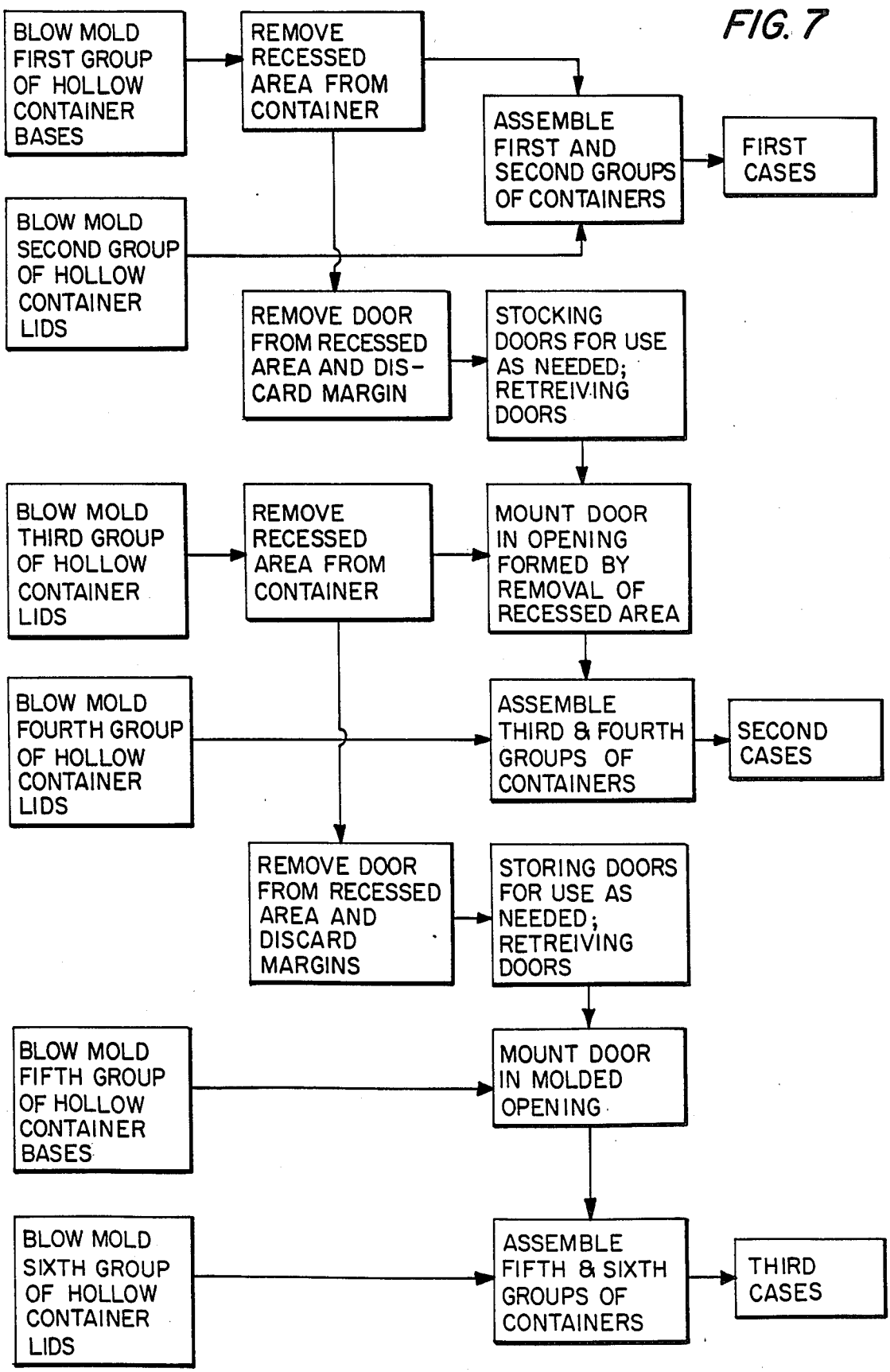
FIG. 7 is a flowchart of the steps of the method of the present invention.

The iterative method of door manufacture described above is shown in the flowchart of FIG. 7, and allows the manufacture of a third group of cases with a compartment, where the compartment door of the third group of cases is cut from the previous workpieces.

The method for making a plurality of first, second and third cases is shown in FIGS. 4–6, in schematic cross-section. It should be understood that FIGS. 4–6 are not drawn to scale with respect to each other. In FIGS. 4A, 5A and 6A are examples of the first, third, and fifth groups of hollow containers, shown as base 28 of FIG. 1; lid 12 of FIG. 2; and base 62 of FIG. 3B respectively.

Referring to FIG. 4A, line R—R shows the location of cuts formed by routing, and line D—D shows the location of die cutting to separate a door 24 from a margin area 27.

As shown in FIGS. 4B and 5C, the door 24 removed from the first group of bases 28 is mounted in the opening 34 in the third group of hollow container lids 12 formed by the removal of the recessed face 32.

Referring to FIGS. 5B and 6C the door 33 removed from the third group of container lids 12 is mounted in base 62.

Each of the examples of the first, third and fifth groups of hollow containers may then be joined with a matching and compatibly sized member of a second, fourth and sixth groups of hollow containers, respectively, to form a plurality of first, second and third cases.

As can be appreciated, the method of the present invention eliminates a separate manufacturing step for making compartment doors. The method also minimizes the amount of waste material that must be recycled or discarded.

While the foregoing description and drawings have shown the method of the present invention in relation to the formation of compartment doors for hollow containers of progressively samaller cases, it is to be understood that the invention is not so limited, and that the method may be used to manufacture compartment doors for cases of varying sizes, using standardized doors manufactured by the method of the present invention.

I claim:

1. A method for manufacturing blow molded plastic cases of the type comprising two hinged hollow articles, in which at least one of said articles includes a compartment, and a door for said compartment, the method comprising the steps of:
   blow molding a first group of hollow articles from a polymeric material, each article of said first group of hollow articles having a first recessed face on one side thereof, each said first recessed face having molded therein a door shape having hinge pins generally in the plane of said door;
   for each article of said first group, removing said first recessed face, and removing said door shape from each said first recessed face to form a door;
   maintaining a stock comprising a plurality of said doors;
   blow molding a second group of hollow articles sized and adapted to be joined to the first group of articles from a polymeric material;
   blow molding a third group of hollow articles from polymeric material, each article of said third group having a second recessed face sized to accommodate said door;
   for each said hollow article of said third group, removing said recessed face to form a compartment opening into a compartment inside each said hollow article of said third group, and forming lateral holes for said hinge pins;
   for each said hollow article of said third group, retrieving one said door from said stock and installing said door in said compartment opening by inserting said door pins into said lateral holes formed in said compartment opening;
   blow molding a fourth group of hollow articles sized and adapted to be joined to the third group of articles from a polymeric material; and
   assembling said first and second groups of articles into a plurality of cases, and assembling said third and fourth groups of articles into another plurality of cases.

2. A method of manufacturing blow molded plastic cases comprising two hollow blow molded containers, the method comprising the steps of:
   blow molding a first group of hollow containers from polymeric material, each container of said first group of containers having a first recessed face on one side thereof, each said first recessed face having molded therein a first formed part and a first margin;
   for each hollow container of said first group, removing said first recessed face;
   for each said first recessed face, removing said first formed part from said first margin area;
   maintaining a stock comprising a plurality of said first formed parts.
   blow molding a second group of containers from a polymeric material; and
   assembling said first and second groups of containers into a plurality of cases.

3. A method of manufacturing blow molded plastic cases comprising two hollow blow molded containers, in accordance with claim 2, further comprising the steps of:
   blow molding a third group of hollow containers from polymeric material, each said container of said third group having a second recessed face sized to accommodate said first formed part, each said recessed face having formed thereon a second formed part and a second margin;
   for each said container of said third group, removing said second recessed face to form a compartment opening into a compartment inside each said hollow container of said third group;
   for each said second recessed face, removing said second formed part from said second margin;
   maintaining a stock comprising a plurality of said second formed parts;
   for each hollow container of said third group, retrieving one said first formed part from said stock of first formed parts and mounting said first formed part in said compartment opening to form a closure for said compartment;
   blow molding a fourth group of hollow containers from a polymeric material; and
   assembling said third and fourth group of hollow containers into a plurality of cases.

4. A method of manufacturing blow molded plastic cases comprising two hollow blow molded containers, in accordance with claim 3, further comprising the steps of:
   blow molding a fifth group of hollow containers from polymeric material, each said container of said fifth group having a third recessed face sized to accommodate said second formed part;

for each said container of said fifth group, removing said third recessed face to form a second compartment opening into a second compartment inside each said hollow container of said fifth group;

for each container of said fifth group, retrieving one said second formed part from said stock and mounting said second part in said second opening to form a closure for said second compartment;

blow molding a sixth group of hollow containers from a polymeric material; and assembling said fifth and sixth group of hollow containers into a plurality of cases.

5. A method of manufacturing blow molded plastic cases comprising two hollow blow molded containers, the method comprising the steps of:

blow molding a first group of hollow containers from polymeric material, each container of said first group of containers having a first recessed face on one side thereof, each said first recessed face having molded therein a first flat rectangular door and a first margin;

routing each said first recessed face from each of said first group of containers;

cutting each said first door from said first margin to provide a separate first door;

maintaining a stock comprising a plurality of said first doors;

blow molding a second group of containers adapted and sized to be joined with said first group of containers from a polymeric material;

blow molding a third group of hollow containers from polymeric material, each said container of said third group having a second recessed face sized to accommodate said first door, each said recessed face having molded therein a second flat rectangular door and a second margin;

for each said container of said third group, routing out said second recessed face to form a first compartment opening into a first compartment inside each said hollow container of said third group;

cutting each said second door from said second margin to provide a separate second door;

maintaining a stock comprising a plurality of said second doors;

for each said container in said third group of hollow containers, retrieving one said first door from said stock of first doors and mounting said first door in said first compartment opening to form a closure for said first compartment;

blow molding a fourth group of hollow containers adapted and sized to be joined with said third group of containers from a polymeric material;

blow molding a fifth group of hollow containers from polymeric material, each said container of said fifth group having a third recessed face sized to accommodate said second door;

for each said container of said fifth group, routing out said third recessed face to form a second compartment opening into a second compartment inside each said hollow container of said fifth group;

for each hollow container of said fifth group, retrieving one said second door from said second door stock and mounting said second door in said second opening to form a closure for said second compartment;

blow molding a sixth group of hollow containers adapted and sized to be joined with said fifth group of containers from a polymeric material;

assembling said first and second groups of containers into a plurality of first cases;

assembling said third and fourth group of hollow containers into a plurality of second cases; and assembling said fifth and sixth group of hollow containers into a plurality of third cases.

* * * * *